United States Patent [19]

Ahmad

[11] Patent Number: 5,386,467
[45] Date of Patent: Jan. 31, 1995

[54] INTELLIGENT NETWORK COMMUNICATION SYSTEM

[75] Inventor: Nisar Ahmad, North Middletown, N.J.

[73] Assignee: AT&T Corp., Murray Hill, N.J.

[21] Appl. No.: 923,289

[22] Filed: Jul. 31, 1992

[51] Int. Cl.⁶ .......................... H04M 7/00; H04M 3/42
[52] U.S. Cl. ..................................... 379/220; 379/207; 379/230
[58] Field of Search ............... 379/201, 207, 219, 220, 379/221, 230, 97, 229

[56] References Cited

U.S. PATENT DOCUMENTS

| | | | |
|---|---|---|---|
| 4,757,267 | 7/1988 | Riskin | 379/219 X |
| 5,136,636 | 8/1992 | Wegrzynowicz | 379/207 |

OTHER PUBLICATIONS

E. G. Sable et al. "Intelligent Network Directions", *AT&T Technical Journal*, Summer 1991, vol. 70, No. 3–4, pp. 2–10.
G. Y. Wyatt et al., "The Evolution Of Global Intelligent Network Architecture", *AT&T Technical Journal*, Summer 1991, vol. 70, No. 3–4, pp. 11–25.
J. J. Lawser et al., "Generic Network Plan", *The Bell System Technical Journal*, vol. 61, No. 7, Sep. 1982, pp. 1589–1598.

Primary Examiner—James L. Dwyer
Assistant Examiner—Harry S. Hong
Attorney, Agent, or Firm—Werner Ulrich

[57] ABSTRACT

This invention relates to a method and apparatus for improving the performance of intelligent networks. In a departure from the prior art, when a data base system, such as a service control point, receives an inquiry from a switching system, if the data base system recognizes that it cannot provide the complete data requested by the inquiry, it directly launches another inquiry to another data base system to provide the missing data. Advantageously, such an arrangement reduces the number of messages transmitted among switching systems and data base systems.

2 Claims, 2 Drawing Sheets

INTELLIGENT NETWORK COMMUNICATION SYSTEM

TECHNICAL FIELD

This invention relates to data communication arrangements in support of telecommunication networks and more specifically in support of intelligent networks.

Problem

A major advance in telecommunication networks of the past decade has been the introduction of the intelligent network (IN) and the advanced intelligent network (AIN). Previous telecommunications networks consisted of switching systems interconnected by transmission facilities. The AIN enhances the capabilities of such systems by providing, in addition, data bases called service control points (SCPs) and further by providing service circuit nodes (SCNs) for customized feature and specialized call handling including querying telecommunication network customers in order to obtain additional information for controlling calls. The SCNs are each connected to an associated switching system and communicate with that switching system over both audio and data facilities while the SCPs are connected to the switching systems over a data signaling network. The data signaling network in most modern systems is a common channel signaling network using the signaling system 7 (SS7) protocol promulgated by the Consultative Committee for International Telegraph and Telephone (CCITT) or by the American National Standards Institute (ANSI).

The intelligent network is used, for example, to route 800 calls. Such calls lack a dial address that directly allows the telecommunications network to determine a destination. Instead, upon receipt of an 800 number, a switch of the network equipped to communicate with the SCPs and therefore designated as a switching services point (SSP) queries an SCP to obtain information as to where to route the call. For a simple 800 call the SCP returns a conventional plain old telephone service (POTS) number, a telephone number that directly identifies the destination, and which can be used for routing the call to the destination in the conventional way.

For some cases, the initial response from the initially queried SCP does not provide enough information to establish a call. Under such circumstances as described, for example, in U.S. Pat. No. 4,924,510 the initial response from the first SCP is used by the SSP to formulate a second request to a second SCP identified in the response message from the first SCP. Such "double dipping" requires four message transmissions to obtain the information necessary for completing a call.

A problem of the present AIN arrangement is that some of the increasingly complex services that are being considered today require more and more exchanges of data between SSPs and SCPs. Such multiple exchanges of data require the use of scarce resources in the SSPs and further cause excessive delay in obtaining all the information necessary for establishing AIN calls.

Solution

The above problem is alleviated and an advance is made over the prior art in accordance with my invention wherein, in a departure from the prior art, an SCP is enhanced to recognize situations wherein it needs additional information from another SCP and directly requests that information from that SCP by sending an information request message over the signaling network interconnecting SCPs and SSPs. The second SCP then sends its response to a user of that response which may be the requesting SCP or the SSP that originally requested data or even a customer that directly or indirectly requested data. If the user is the requesting SCP, this SCP will, directly or indirectly forward data from the response of the second SCP to the SSP. Advantageously, such an arrangement reduces the number of query messages that must be transmitted from the SSPs.

In accordance with one aspect of the invention, the first SCP which requires information from a second SCP transmits enough information to the second SCP so that the second SCP can transmit a full response directly to the requesting SSP. Advantageously, such an arrangement requires only three message transmissions (SSP to first SCP, first SCP to second SCP, second SCP to SSP) instead of the four (SSP to first SCP, first SCP to SSP, SSP to second SCP, second SCP to SSP) that would otherwise be required.

In accordance with one aspect of the invention, the SCP can also send requests to an SCN, which may include data bases or to another data base that is part of an SSP or other switching system. Queries from the SCP to the SCN or to another data base in the SSP are sent transparently through the SSP that is connected to the SCN so that no processing is required by the SSP. Similarly, the SCN or a data base of the SSP transmits its responses directly to the SCP. Alternatively, direct data links between the SCP and the SCN can be established. Sometimes, the SSP recognizes that a connection from the customer to an SCN is required and establishes that connection before or at the same time as it transmits a query to the SCP. If the SSP has not established such a connection and the SCP recognizes the need for this connection, the SCP first signals to the SSP to establish that connection.

In accordance with a specific embodiment of the invention, the data exchanges between SCPs and between an SCP and an SCN use the so-called non-call associated (NCA) protocol messages. Advantageously, this arrangement allows for a smooth transition from the present AIN configuration to the AIN configuration enhanced in accordance with the principles of this invention. NCA provides the capability for the definition of new fields that may be required for some applications of this invention.

In accordance with another aspect of the invention, the first SCN queries the second SCN and uses the response data from the second data base to formulate a complete response to the SSP that queried the first data base. Advantageously, such an arrangement substantially reduces the amount of data processing required at the SSP. The data messages between SCPs may be routed directly through a common channel signaling (CCS) network such as the SS7 network, or may be routed via the SS7 network and an SSP, acting as a signal transfer point to relay a data message received from one SCP or SCN to another SCP or SCN. The SSP can also provide protocol conversion if the data bases use different signaling protocols.

DETAILED DESCRIPTION

Figure 1:
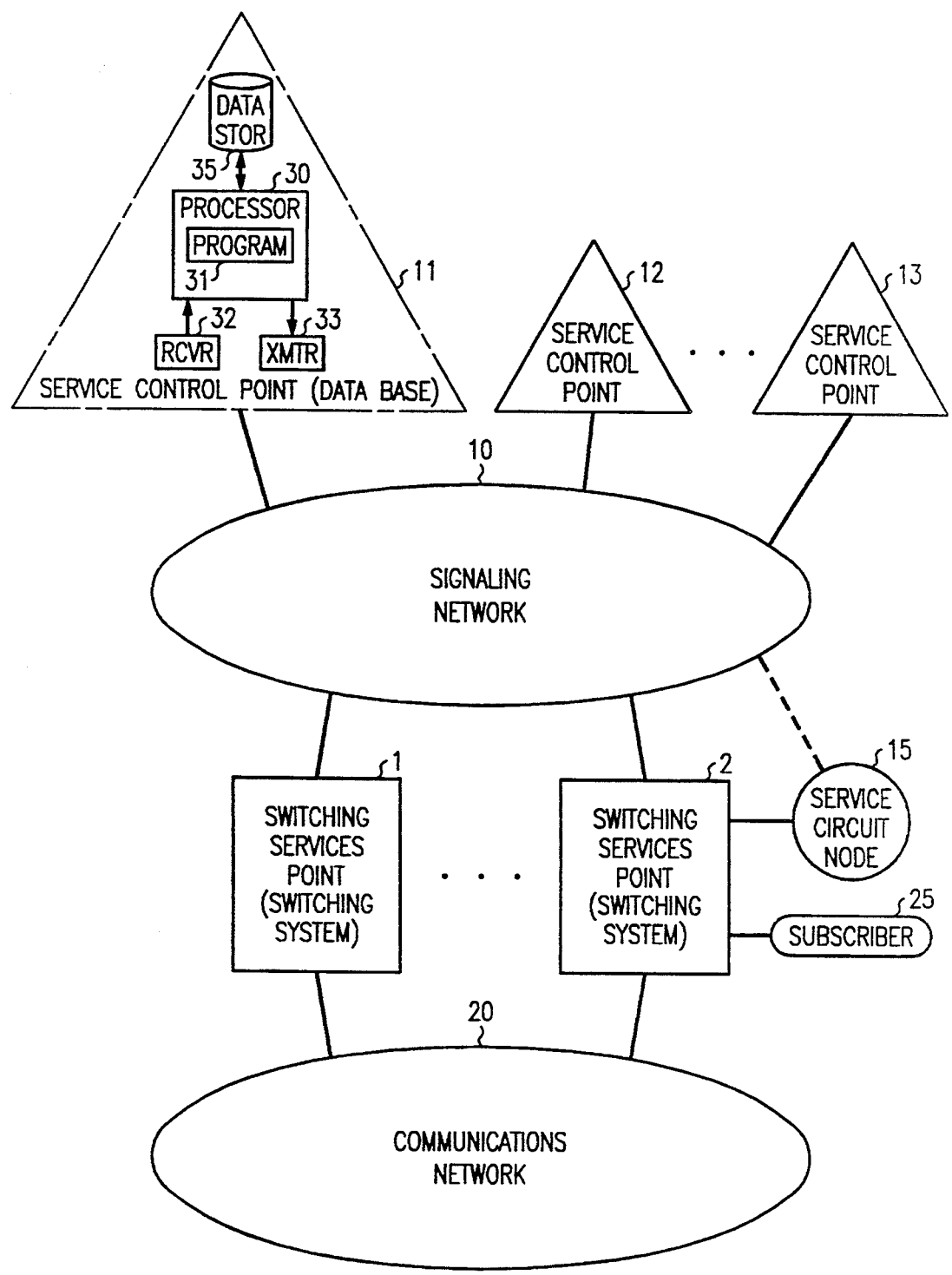
FIG. 1 is a block diagram of an advanced intelligent network and the communications paths among the elements in accordance with this invention.

FIG. 1 is a block diagram of elements of an advanced intelligent network as connected in accordance with the principles of this invention. The elements shown include switching systems, in this case, SSPs 1 and 2, data base systems SCPs 11, 12, and 13, and SCN 15. The SCPs and SSPs are interconnected by signaling network 10 which transmits SS7 messages between SCPs and SSPs or other switching systems connected to the signaling network. In a departure from the prior art, signaling network 10 transmits messages between SCPs in addition to transmitting messages between SSPs or between an SSP and an SCP. The SSPs 1 and 2 are interconnected with each other and with other switching systems of the AIN by communications network 20. SCN 15 is connected to SSP 2 by both voice and signaling links. In an alternative arrangement, signaling links of SCN 15 can also be connected directly to signaling communications network 10.

Each of the SSPs 1 and 2 are SSPs equipped to communicate via signaling network 10 with SCPs 11, 12, and 13. Both are program controlled switching systems controlled by one or more processors each responsive to a stored program of the processor. Each of the SCPs also includes a program controlled processor for analyzing input messages, controlling access to data stored in the SCP and formulating responsive output messages. In accordance with the principles of this invention, these output messages also include querying messages for other SCPs and the processors are responsive to messages received from other SCPs for formulating a response message to an SSP. An example of the use of this arrangement is the following, referred to hereinafter as enhanced 800 service. Suppose that there is a business which has an 800 number that is meant primarily for use by customers within a state or within a region of a state (an example of the latter might be a Chicago metropolitan area 800 number). However, the business also has a number of important customers and it wishes to encourage these customers to call using the same 800 number. The business provides each of these customers with a personal identification number so that only authorized customers can call the 800 number from out of state.

Subscriber 25 is connected to switching system 2, either directly or, in the more usual case, through a telecommunications access network. The user has dialed the 800 number of the business specified above. This number, along with the caller's directory number, as identified by automatic number identification (ANI), is transmitted to SSP 2. In response to this, the switching system 2 transmits a query to SCP 11 which is a basic 800 number response data base. SCP 11 determines that this is not a valid 800 number for a customer from that area (as defined by the numbering plan area (NPA) of subscriber 25's directory number). However, SCP 11 further recognizes that this particular 800 number has some customers who are able to call that 800 number from outside the region. Therefore SCP 11 transmits a message to SSP 2 to request that the customer be connected to SCN 15 and further that the customer be prompted by SCN 15 to enter a personal identification number (PIN). The customer enters this PIN which is transmitted in a message to SSP 2 and thence to SCP 11. SCP 11 does not contain the data for verifying the PIN and therefore launches a query to SCP 12. The query is transmitted over SS7 signaling using an NCA message (e.g., a Transaction Capabilities Application Part (TCAP) message within a new field) and the message further contains routing information for the call in case the call can be completed. (This routing information would be the POTS number of the business.) SCP 12 verifies that the PIN for the customer identified by the ANI of that customer transmitted in the NCA message is proper and transmits to switching system 2 the POTS number of the business along with an indication that switching system 2 may take further steps to complete the call to that POTS number.

SCP 11 is controlled by a processor 30, operative under the control of a program 31. The processor is connected to a data receiver 32 for receiving signaling messages from signaling network 10 and a data transmitter 33 for transmitting data to the signaling network. Data for the SCP is stored in data storage 35.

The data bases may be interconnected directly via the signaling network 10, or it may be more convenient to connect a data base to a switch via the signaling network, and to use the switch as a signal transfer point to relay a message to another data base via the signaling network.

Figure 2:
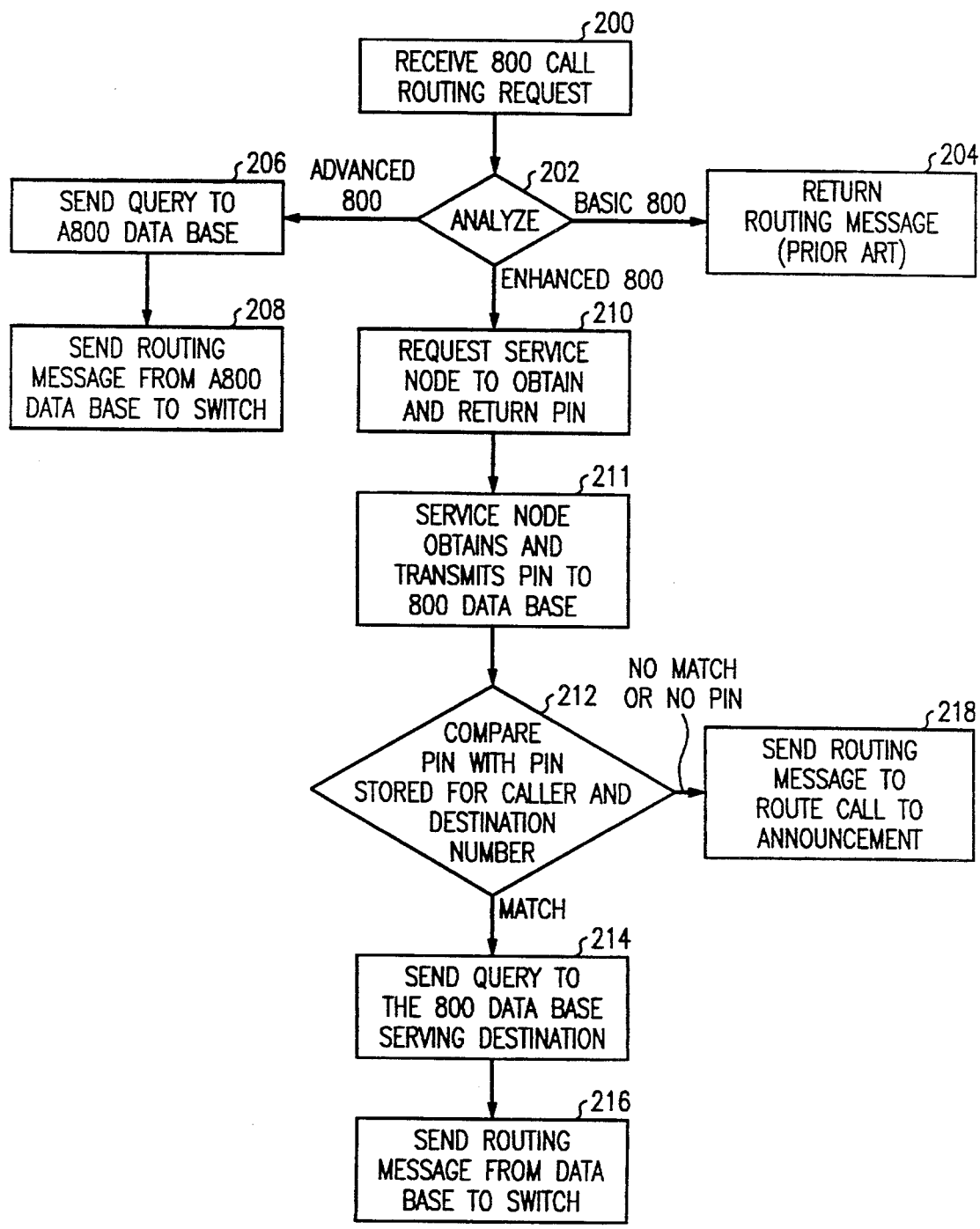
FIG. 2 is a flow diagram of a program performed in one or more of the data bases of the intelligent network.

FIG. 2 is a flow diagram of actions performed in the data bases in response to receipt of an 800 call routing request. The routing request is received (action block 200) and analyzed (decision block 202). If the number is that of a basic 800 service, then the routing message is returned directly to the requesting switch in accordance with the teachings of the prior art (action block 204). If the initial data base recognizes that this is an advanced 800 call, then a query is sent to the advanced 800 data base identified in the data stored in the original data base. This query contains sufficient information so that the advanced 800 data base can send full routing information directly to the switch. The query is sent in action block 206 and the advanced 800 data base, responsive to this inquiry, sends a routing message for the call directly to the switch (action block 208). Thus, only three messages (SSP to 800 data base, 800 data base to A800 data base, and A800 data base to SSP) are required instead of the four messages (SSP to 800 data base, 800 data base to SSP, SSP to A800 data base, and A800 data base to SSP) of the prior art. In other alternative embodiments, the advanced 800 data base can send a response to the requesting 800 data base for the latter to return information directly to the requesting switch.

If the analysis indicates that this is an enhanced 800 call as defined above then the data base transmits a message to request that the service node obtain a personal identification number from the caller and return that PIN to the data base (action block 210). This request is transmitted to the SSP if no connection has been set up between the calling subscriber 25 and the service node 15 or is sent directly to the service node if such a connection already exists. The service node will then request the PIN from the caller and will transmit that PIN to the data base (action block 211). In the preferred embodiment, this transmission is done by means of a message which has as its destination the data base, so that the only role of the switch in the transmission of the message is to act as a signal transfer point to relay the message received from the service node to the requesting data base or, in alternative embodiments, to provide protocol conversion. In alternative embodiments, the service node replies to the switch which then formulates a separate message for transmission to the data base. In case no PIN has been obtained from the caller, the service node returns an indication to that effect instead of returning the PIN. In decision block 212 the data base compares the PIN (if any) received from the service node with the PIN stored for that caller and that particular 800 destination number. If there is a match, then the data base sends a query to the 800 data base serving the destination (action block 214) and that data base sends a routing message for routing the call, in the preferred embodiment, directly to the requesting switch. In other embodiments, this data base could send the information back to the original 800 data base that was queried for that data base to pass on to the switch.

For this enhanced 800 service, the principles of this invention avoid the necessity of repeatedly sending intermediate messages (request PIN, PIN obtained, identity of 800 data base serving destination) to the SSP for the SSP to process and to initiate another query message. This service is just one example of a service that can be implemented more efficiently, with less processing load on the SSP and shorter call set-up times, in accordance with this invention.

If either no PIN has been obtained or there is no match, then a routing message to route the call to an announcement ("your call cannot be completed" or equivalent) is returned to the switch (action block 218).

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In an intelligent network comprising a plurality of telecommunications switching systems and data base systems, said switching systems and data base systems being interconnected by a signaling network, a method of establishing a call comprising the steps of:

sending a query, for data for establishing said call, from one of said switching systems to a first one of said data base systems;

in said first data base system, determining whether said first data base system has enough data for responding to said query;

responsive to said first data base system determining that it does not have enough data to respond to said query, said first data base system sending a second query to a second one of said data base systems said second query comprising information to permit .the second data base system to transmit a response message directly to said switching system;

said second data base system finding data for responding to said second query and transmitting a first response message comprising said data directly to said switching system; and said switching system using said data in said response message for establishing said call.

2. In an intelligent network comprising a plurality of telecommunication switching systems and data base systems, said switching systems and data base systems being interconnected by a signaling network, a data base system comprising:

means for receiving data from said signaling network;
means for transmitting data to said signaling network; and processor means, operative under the control of a program and responsive to a first query message received by said means for receiving, for determining whether said data base system has enough data for responding to said query, and if said data base system does not have enough data to respond to said query, for controlling the transmitting by said means for transmitting of a second query over said signaling network, to a second one of said data base systems for finding data and transmitting a response message comprising said found data for responding to said second query to a user of said response, wherein said second query comprises information so that the second data base system can respond directly to a source of said first query.

* * * * *